(12) United States Patent
Roddis

(10) Patent No.: US 7,712,744 B2
(45) Date of Patent: May 11, 2010

(54) GLAND PLATE

(75) Inventor: Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 922 days.

(21) Appl. No.: 10/519,279

(22) PCT Filed: Jun. 23, 2003

(86) PCT No.: PCT/GB03/02688

§ 371 (c)(1),
(2), (4) Date: Aug. 19, 2005

(87) PCT Pub. No.: WO04/001258

PCT Pub. Date: Dec. 31, 2003

(65) Prior Publication Data

US 2006/0097455 A1 May 11, 2006

(30) Foreign Application Priority Data

Jun. 22, 2002 (GB) .................................. 0214636.3

(51) Int. Cl.
*F16J 15/34* (2006.01)
*F16B 43/00* (2006.01)

(52) U.S. Cl. .................... 277/370; 277/371; 277/375; 411/531; 411/536

(58) Field of Classification Search ......... 277/370–371, 277/375; 411/531–533, 536, 539, 542
See application file for complete search history.

(56) References Cited

U.S. PATENT DOCUMENTS

| 1,148,491 | A | * | 7/1915 | Hall | 411/532 |
| 2,006,525 | A | * | 7/1935 | Thal | 411/80.5 |
| 2,863,680 | A | * | 12/1958 | Taltavall, Jr. | 277/370 |
| 3,170,365 | A | * | 2/1965 | Vaughn | 411/532 |
| 4,484,771 | A | | 11/1984 | Schulz | 285/138 |
| 4,934,861 | A | * | 6/1990 | Weeks et al. | 403/408.1 |
| 5,217,234 | A | | 6/1993 | Hornsby | 277/15 |
| 6,210,107 | B1 | * | 4/2001 | Volden et al. | 415/170.1 |

FOREIGN PATENT DOCUMENTS

| DE | 837345 C | 4/1952 |
| DE | 858915 C | 12/1952 |
| DE | 2838514 A1 | 3/1980 |
| DE | 7826 242 U1 | 4/1980 |
| DE | 2853722 A1 | 6/1980 |
| DE | 3700125 A1 | 5/1988 |

OTHER PUBLICATIONS

International Search Report dated Sep. 5, 2003 for PCT/GB03/02688.

* cited by examiner

*Primary Examiner*—Vishal Patel
(74) *Attorney, Agent, or Firm*—Myers Bigel Sibley & Sajovec

(57) ABSTRACT

A gland plate includes a rigid, disk-shaped element that includes at least one radially extending wall having a thickness of from about 0.1 to 4 mm.

11 Claims, 12 Drawing Sheets

GLAND PLATE

RELATED APPLICATIONS

The present application is a 35 U.S.C. 371 national phase application of PCT International Application No. PCT/GB2003/002688, having an international filing date of Jun. 23, 2003, and claiming priority to Great Britain Patent Application No. 0214636.3, filed Jun. 22, 2002, the disclosures of which are incorporated herein by reference in their entireties. The above PCT International Application was published in the English language and has International Publication No. WO 2004/001258 A1.

FIELD OF THE INVENTION

This invention relates to gland plates and particularly, but not exclusively, to gland plates which are fitted to or form part of mechanical seals which are used in connection with rotating devices or equipment in many different types of industries.

BACKGROUND OF THE INVENTION

A mechanical seal comprises a "floating" component which is mounted to be axially movable around the rotary shaft of, for example, a pump, and a "static" component which is axially fixed, typically being secured to a housing. The floating component has a flat annular end face, i.e. its seal face, directed towards a complementary seal face of the static component. The floating component is urged towards the static component to close the seal faces together to form a sliding face seal, usually by means of one or more spring members. In use, one of the floating and static components rotates; this component is therefore referred to as the rotary component. The other of the floating and static components does not rotate and is referred to as the stationary component.

Those seals whose floating component is rotary are described as rotary seals. If the floating component is stationary, the seal is referred to as a stationary seal.

If the sliding seal between the rotary and stationary components are assembled and pre-set prior to despatch from the mechanical seal manufacturing premises, the industry terminology for this is "cartridge seal". If the rotary and stationary components are despatched individually (unassembled) from the mechanical seal manufacturing premises, the industry terminology for this is "component seal".

Mechanical seals are used in all types of industries to seal a variety of different process media and operating conditions. The general industry term which defines the area adjacent to the process media is "inboard". The industry term which defines the area adjacent to the atmospheric side is "outboard".

With the exception of the mechanical seal faces, the most costly item of a cartridge mechanical seal is the gland plate. The raw material for a gland plate is typically either cast metal or a solid metal bar. Alternative materials such as plastic are also occasionally used. Subsequent machining operations on the gland plate raw material are required in order to accurately fit the mating components.

For most types of mechanical seals, typically, one seal gland is employed for each size of seal in both single and double seal formats. With over 30 standard seal sizes, in any given product range and at least two gland formats, a company's gland plate inventory costs can be considerable. Furthermore gland production costs are high due to the number of manufacturing operations required to process a given gland.

There is a need for a seal gland which is of relatively low cost including the use of material which, after the original manufacturing operation, requires no subsequent machining such as turning, milling or drilling.

SUMMARY OF THE INVENTION

According to the present invention there is provided a gland plate comprising a rigid disk-shaped element including at least one radially extending wall having a thickness of from 0.1 to 4 mm.

Preferably the thickness of the wall is from 1 to 2 mm and more preferably is about 1.5 mm.

Preferably set element comprises two axially spaced, radial extending walls. More preferably said element further includes inner and outer circumferential walls extending between said radially extending walls.

Preferably the element is a hollow structure. Alternatively the element may be filled with a suitable material such as concrete, plastics or water.

Preferably said wall or walls of the elements are made of metal and more preferably said wall or walls are formed by a pressing operation.

The gland plate according to the present invention may include a first part providing a first radially extending wall and a second part providing a second radial extending wall, said first radial extending wall being axially spaced from said second radial extending wall.

Preferably said first and second parts together provide inner and outer circumferential walls.

Preferably the gland plate is provided with one or more through holes, more preferably formed by a pressing or punching operation.

Preferably the material displaced when the or each of said holes is being formed provides a strengthening support around said hole.

Preferably a gland placed in accordance with the present invention is in the form of a hollow structure having first and second radially extending walls as well as means for feeding fluid through said gland plate.

BRIEF DESCRIPTION OF THE DRAWINGS

The accompanying drawings are as follows:

FIG. 2 shows a cross sectional view of a single cartridge mechanical seal of the invention and FIG. 2b shows an alternate setting clip arrangement;

DETAILED DESCRIPTION OF THE INVENTION

The invention will now be described, by way of examples only, with reference to the accompanying drawings.

Figure 1:
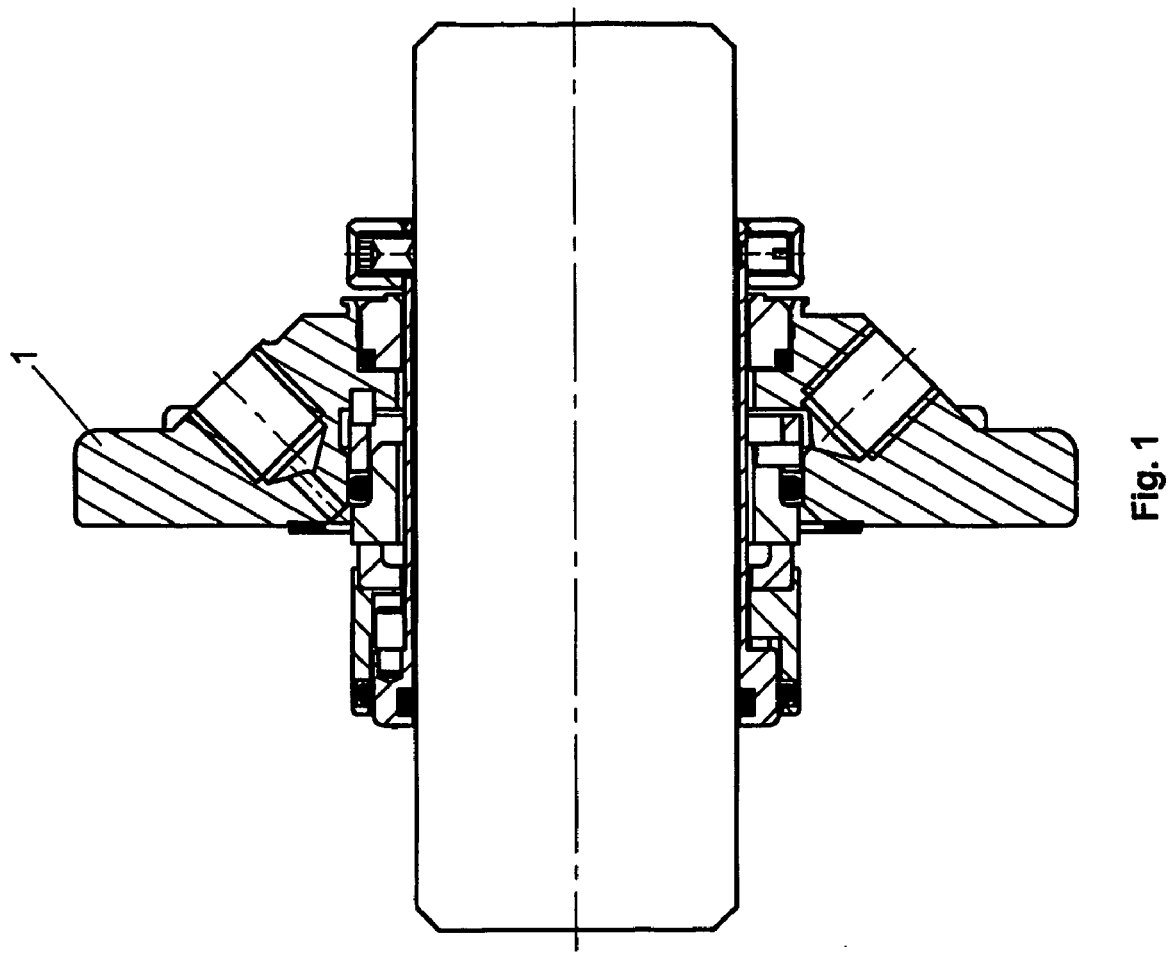
FIG. 1 shows a cross sectional view of a conventional prior art single cartridge mechanical seal.

The conventional prior art single cartridge mechanical seal depicted in FIG. 1 includes a gland plate 1 which requires a considerable number of machining operations and machine set-ups to allow mating components to be assembled and placed.

The total cost of the gland plate 1 is the sum of the machining costs and the costs of the raw material. As illustrated, the raw material of the gland plate 1 in FIG. 1 is a casting. If the gland plate is manufactured from a solid material, the raw material cost would be lower. However the machining costs are typically considerably more.

Figure 2:
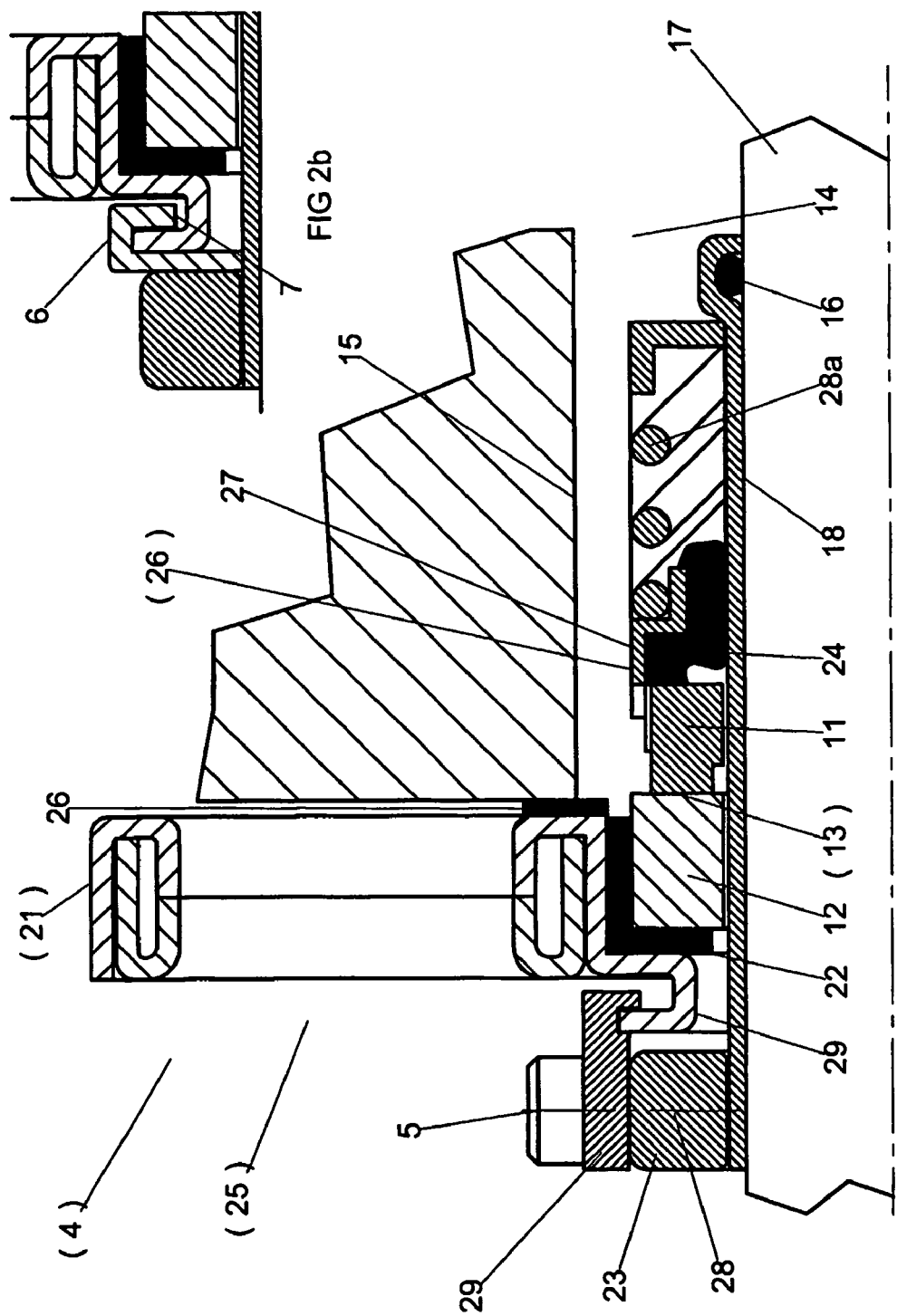

FIG. 2 shows a single cartridge mechanical seal 4 of the invention. The rotary and axially floating seal face 11 is spring biased towards a static stationary seal face 12. The rotary seal face 11 is allowed to slide on the static seal face 12. The interface between the rotary seal face 11 and stationary seal face 12 forms sealing area 13. This sealing area 13 is the primary seal that prevents the process media 14 from escaping from the process chamber 15.

In addition to the sliding seal face 13, the process media 14 is sealed by a sleeve elastomer 16 in contact with the shaft 17 and sleeve 18. This has been termed the first secondary sealing area.

The second secondary sealing area is formed between stationary seal face 12 and stationary gland plate assembly 21 using elastomeric member 22.

The third secondary sealing area is formed between the rotary seal face 11 and the sleeve 18 using elastomeric member 24.

The fourth secondary sealing area is formed between the gland plate assembly 21 and the process chamber 15 using gasket 26.

The four secondary sealing areas and the primary sliding sealing interface prevent the process media 14 from escaping from the process chamber 15.

The static seal face 12 is prevented from rotating by radial squeeze between the elastomeric member 22 and the gland plate assembly 21. An alternative anti-rotation device could be incorporated into the design if so desired.

The sleeve 18 is axially terminated adjacent to the clamp ring 23 which contains at least one screw 28 for securing the seal assembly 25 to the shaft 17. Screw 28 provides rotational drive from shaft 17 to the rotary components in the seal assembly 26. Rotary seal face holder assembly 26 consists of at least one holder 27. This holder, preferably metallic in construction, transmits the axial spring 28a force to the seal face 11.

Preferably, although not essential, at least one setting clip 29 is used to position the axial and/or radial distance between the rotating clamp ring 23 and gland plate assembly 21. The latter is provided with an integral annular hook 29a for engagement with the setting clip 29.

The setting clip 29 could be either removable using clip screw 5 or, as shown in FIG. 2b, setting clip 6 could be a sacrificial wearing member of seal assembly 25.

Sacrificial clip 6 may be of continuous circular construction or split into segments. Since sacrificial clip 6 is a potentially wearing component, it is preferably made from a suitable material such as plastic or brass. Furthermore, if clip 6 has a continuous circular section, it should be sufficiently flexible to allow engagement into the gland clip recess 7.

Figure 3:
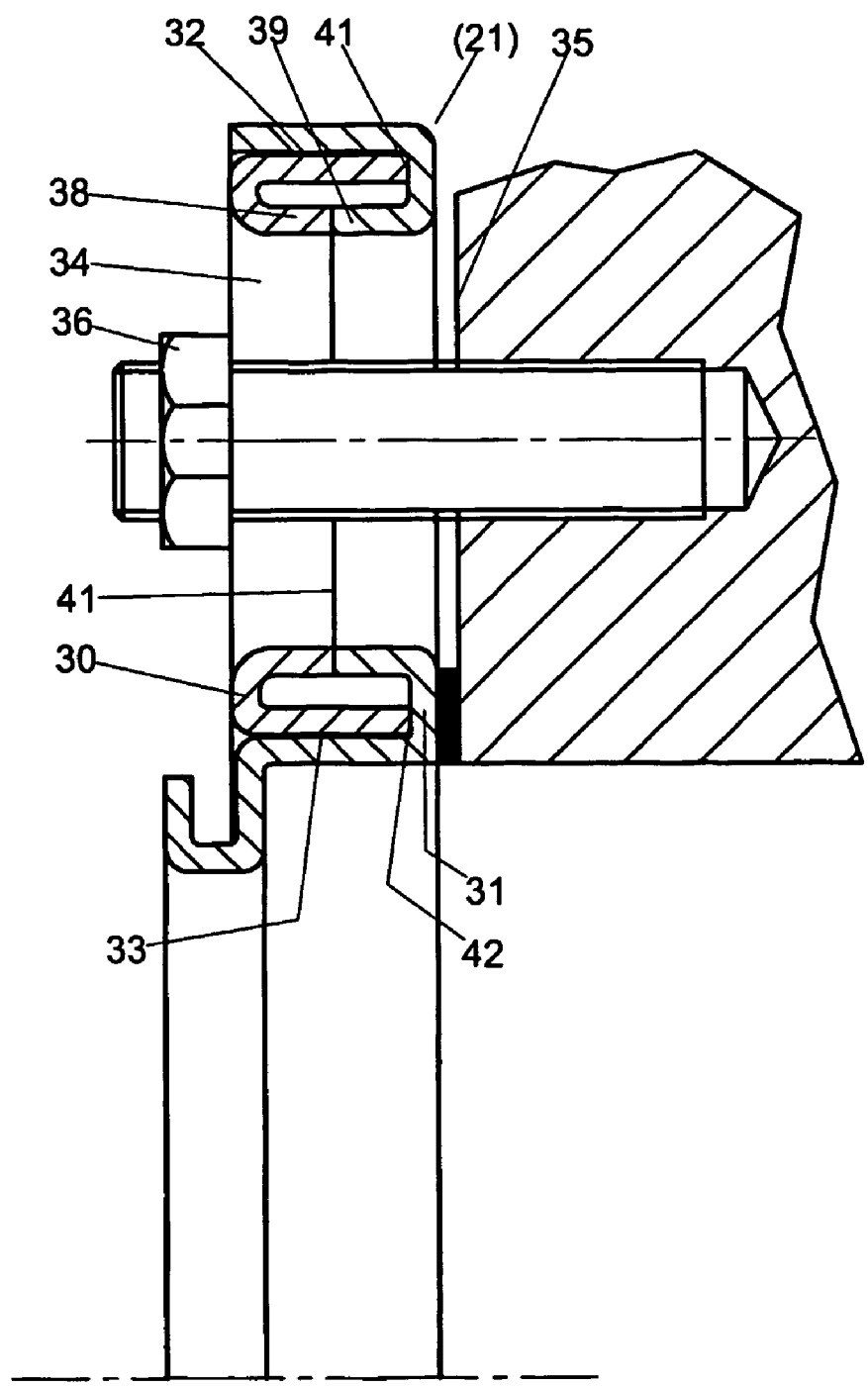
FIG. 3 corresponds to FIG. 2 and shows a cross sectional view of the gland plate assembly of the invention.

FIG. 3 corresponds to FIG. 2 and shows a partial cross section through the gland plate assembly 21.

The gland plate assembly 21 is typically constructed from more than one part. The front plate 30 aligns on at least one feature with the rear plate 31. Preferably, alignment is made on either the outer radial portion 32 of the front plate 30 or the inner radial portion 33 of the front plate 30. As shown in FIG. 3 it is preferable if said location features are both the inner 33 and outer 32 radial portions of the front gland plate 30 since this provides strength to the gland plate assembly 21. This also provides a surface where an adhesive could be applied.

The location features on the front gland plate 30 could be of any shape or size, and/or positioned in the rear gland plate 31, or positioned on any combination of both front 30 and rear 31 gland plates.

Since both front 30 and rear 31 gland plates are manufactured from pressed material steel, preferably a non-corrosive steel material such as stainless steel, the gland plate assembly 21 manufacturing costs are extremely low.

The experienced reader will note that pressed sheet steel, of say 1.0 mm 0.040" to 1.5 mm 0.060" thickness, can be extremely strong when designed in a manner where the physical shape of the cross section, including the bends in the material, create a rigid structure.

From FIG. 3, the gland plate assembly 21 has preferably at least one bolt slot 34 which allows the gland plate assembly 21 to be fixed to the process chamber 35 mounting face, using an appropriate screw 36.

Figure 4:
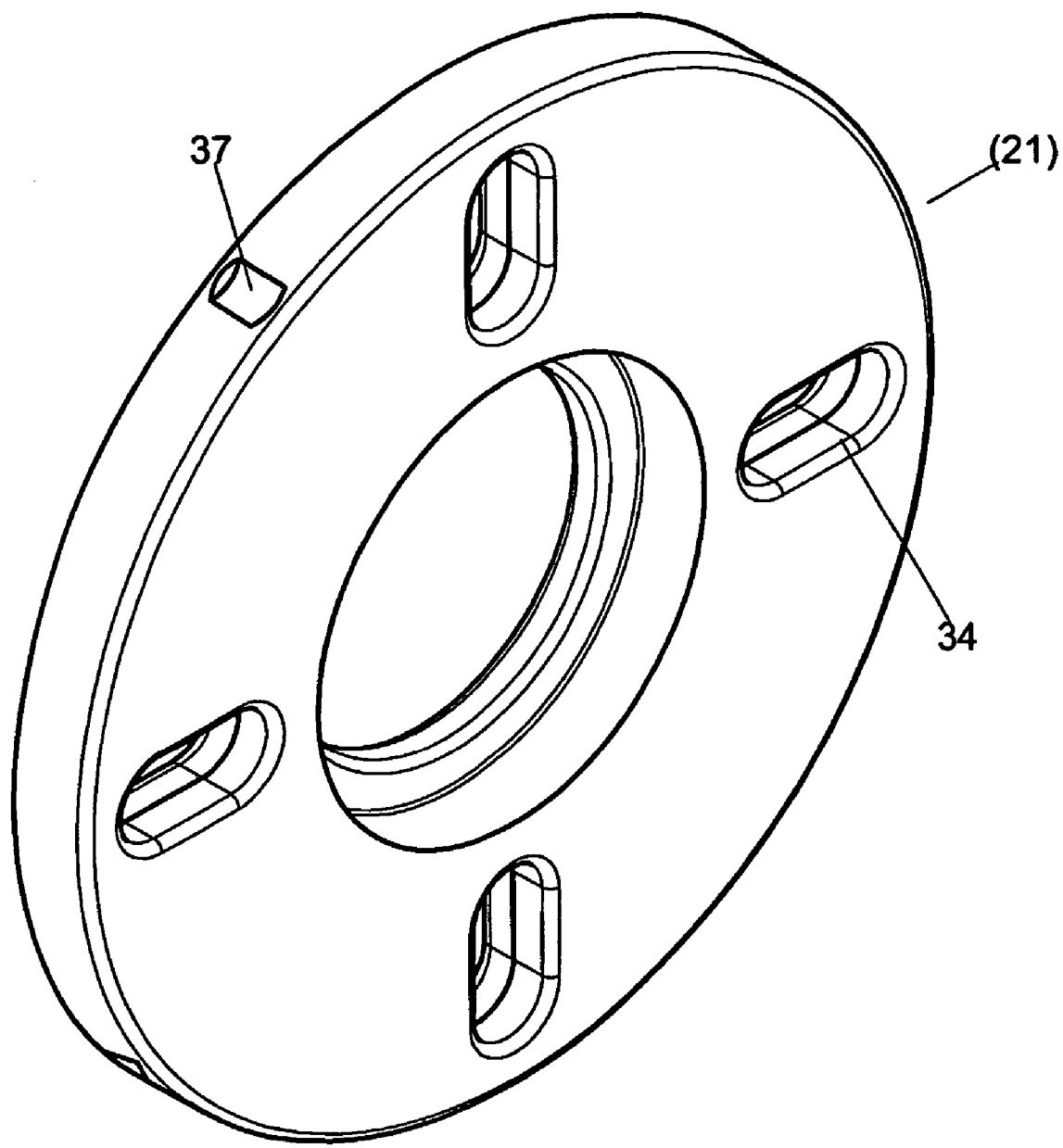
FIG. 4 corresponds to FIGS. 2 and 3 and shows an isometric of the two pressed components which, when assembled, make the gland plate assembly of the invention.

FIG. 4 corresponds to FIG. 3, and shows an isometric view of the gland plate assembly 21. The gland plate assembly 21 has preferably four-bolt slots 34 equal spaced which allows it to be fixed to the process chamber. The gland plate assembly 21 is held together both axially and rotationally by at least one crimp indentation 37 in the outer radial surface of the gland plate assembly 21. It is preferred that said gland plate assembly 21 is further held together by either a suitable adhesive, chemical bond and/or permanent physical operation such as welding.

From FIG. 3, should the design of the invention be constructed from more than one piece of sheet metal, particularly around the bolt slot area 34, the slots 38 and 39 in both front 30 and back 31 plates should align with each other.

Figure 5:
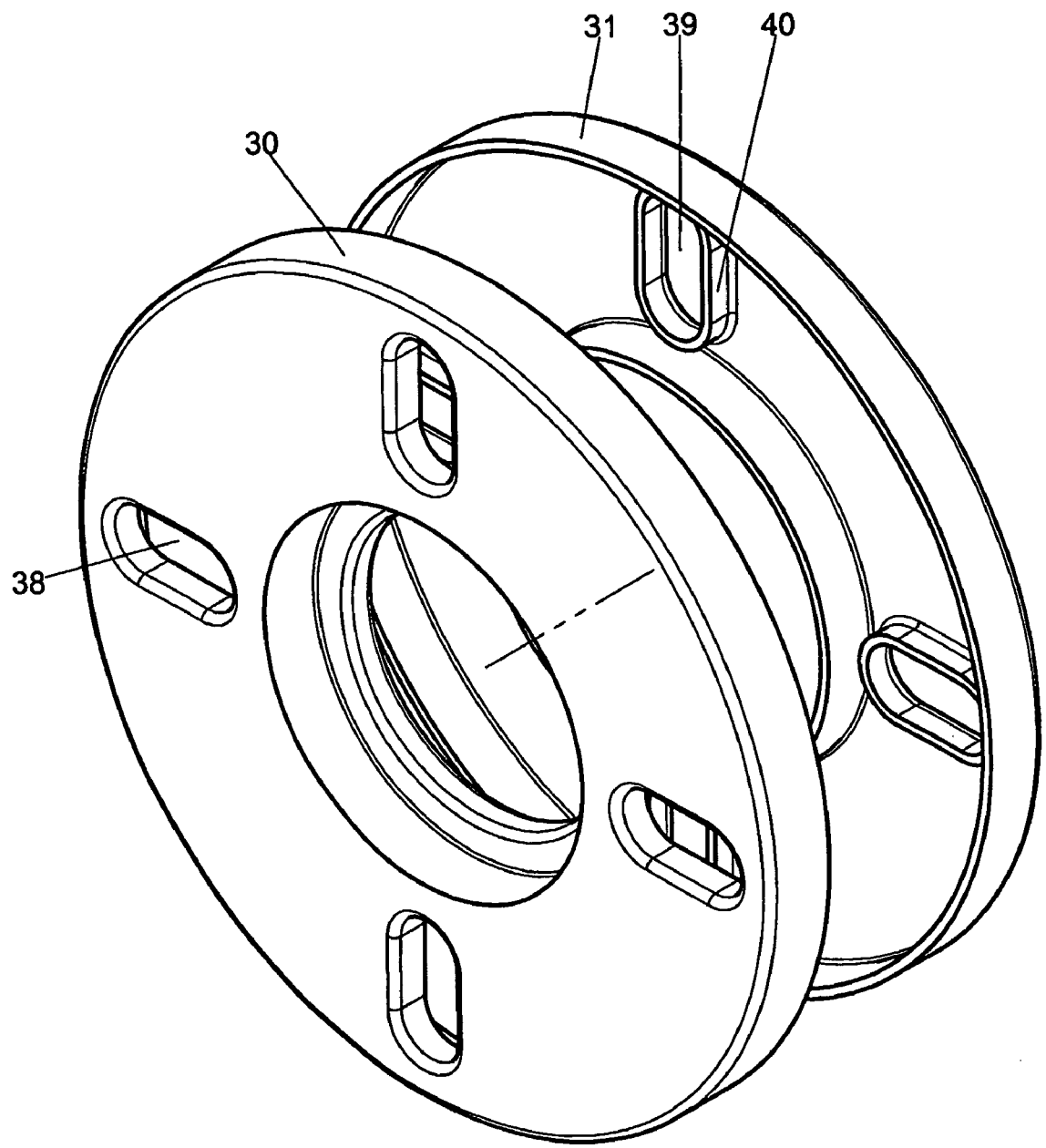
FIG. 5 corresponds to FIG. 4 and shows an exploded isometric view of the two pressed components which, when assembled, make the gland plate assembly of the invention.

FIG. 5 illustrates an isometric view of the front 30 and back 31 plates, which make up the respective gland plate assembly 21 shown in FIG. 4.

During the gland plate 30 and 31 manufacturing process, the bolt slots 39 and 38, are typically formed in the sheet material by a pressing or punching operation. During said operation, the sheet material is displaced 40. The displaced material 40 surrounding the circumference of the slot 38 and 39 is advantageous as this provides strength to this area of the gland plates 30 and 31. This is important since at least one screw and the resulting clamping force from the screw is transmitted into this area of the gland plate 30 and 31.

It is deemed to be of further benefit, when at least two gland plates, front 30 and back 31 are utilised in the gland plate assembly 21 as the combined strength is a multiple of the two components.

From FIG. 3, it is advantageous, although not essential, to allow the axial end 41 of the displaced slots 38 and 39 in the both front 30 and back 31 plates to butt against each other.

If both axial ends 41 of the displaced slots butt against each other, the resulting compressive force from screw 36 has to buckle the displaced material surrounding either slot 38 and 39, particularly if the gland back face is flush against the process chamber face 35. This butted displaced slot design is therefore very strong and able to withstand compressive loads from screws or bolts acting through the slots 38 and 39.

From FIG. 3, it is of further advantage if the front gland plate 130 axially locates against the back gland plate 31 at its outwardly radial and axial position 41 and/or its inwardly radial and axial position 42. Therefore as compressive force is applied from the screw 36, the outer and inner most radial portions of the front gland plate 30 gain axial support from the back gland plate 31.

Figure 6:
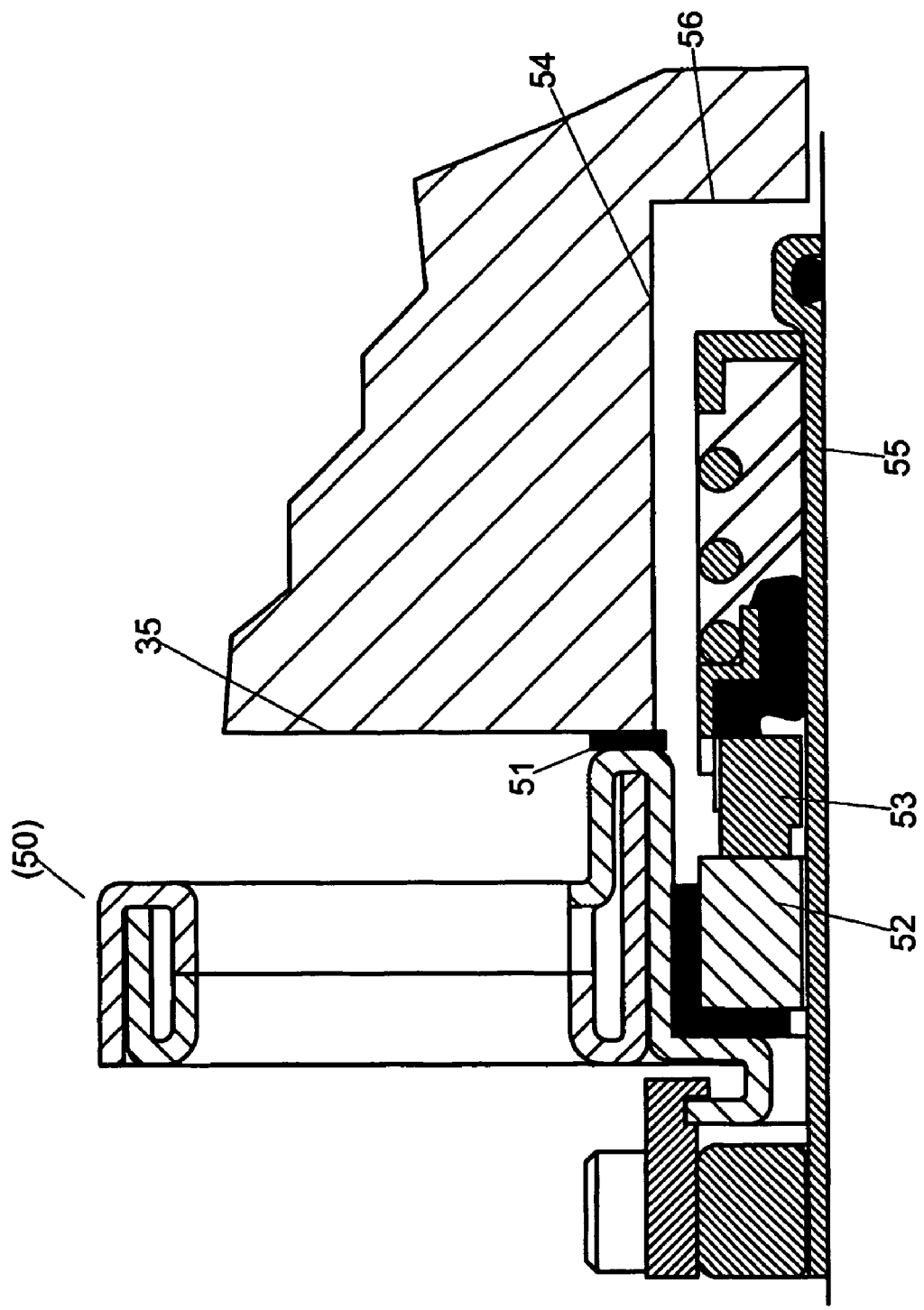
FIG. 6 shows an alternative single cartridge seal of the invention, showing by way of example only, a different gland plate assembly.

FIG. 6 shows another single cartridge seal design of the invention. The gland plate assembly 50 is extended axially away from the gasket 51 bolting face thereby allowing the stationary seal face 52 and corresponding rotary seal face 53 to be positioned further outboard to that of FIG. 2.

This offers certain advantages, for example, if a rotary seal face head 53 is radially too large for the rotating equipment seal chamber bore 54, the design shown in FIG. 6 allows the rotating seal face head 53 to be positioned in the gland plate assembly 50. This prevents rotating equipment modifications.

Alternatively, if there is insufficient axial room due to an obstruction 56 inside the rotating equipment, the rotating seal face 53 and sleeve 55 can be positioned axially away from the obstruction 56. This design shown in FIG. 6 is therefore of considerable benefit.

Figure 7:
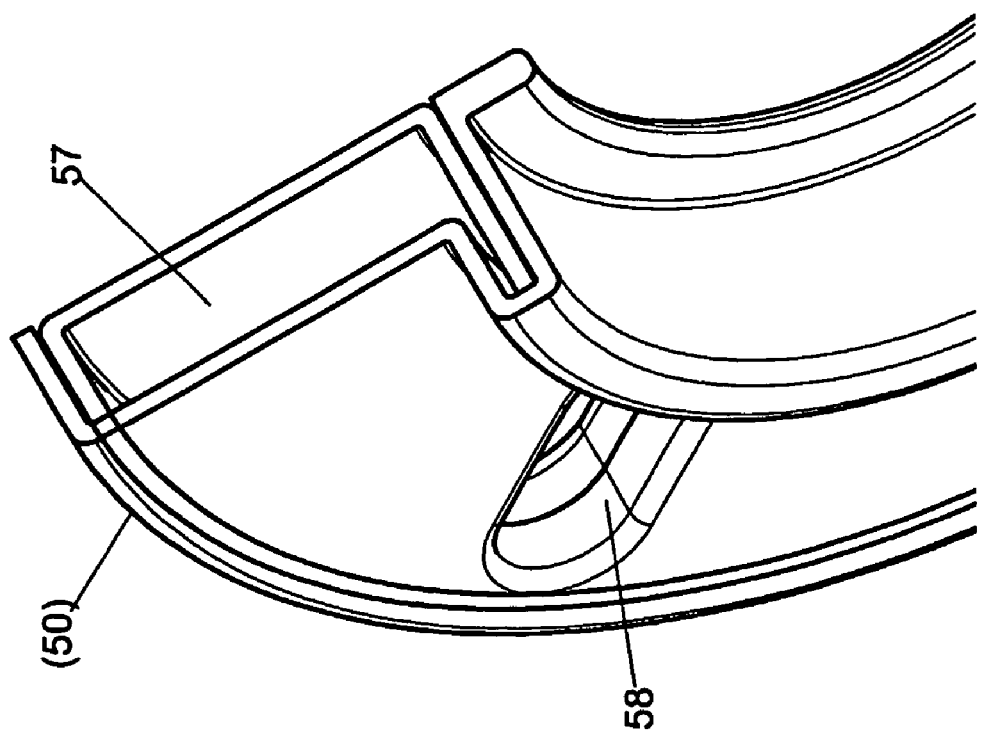
FIG. 7 corresponds to FIG. 6 and/or FIG. 4 and shows a quarter isometric cutaway of the gland plate assembly of the invention.

FIG. 7 corresponds to FIG. 6 and/or 4 and illustrates a quarter cutaway of the gland plate assembly 50. It will be noted that portions of the gland plate assembly are hollow 57.

Said hollow portions 57 correspond to areas where the strength of the gland plate assembly 50 is deemed not to be critical. Should any region of the gland plate assembly 50, other than the bolt slot area 58, require strength or rigidity, then one or more protrusions, indentations, or portions of displaced material could be incorporated adjacent to said region.

Referring back to FIG. 2 the sleeve 18 is preferably a component which may be pressed from sheet steel. While the invention is by no means limited to this, this is a preferred production process in order to maintain a low assembled seal cost price.

Figure 8:
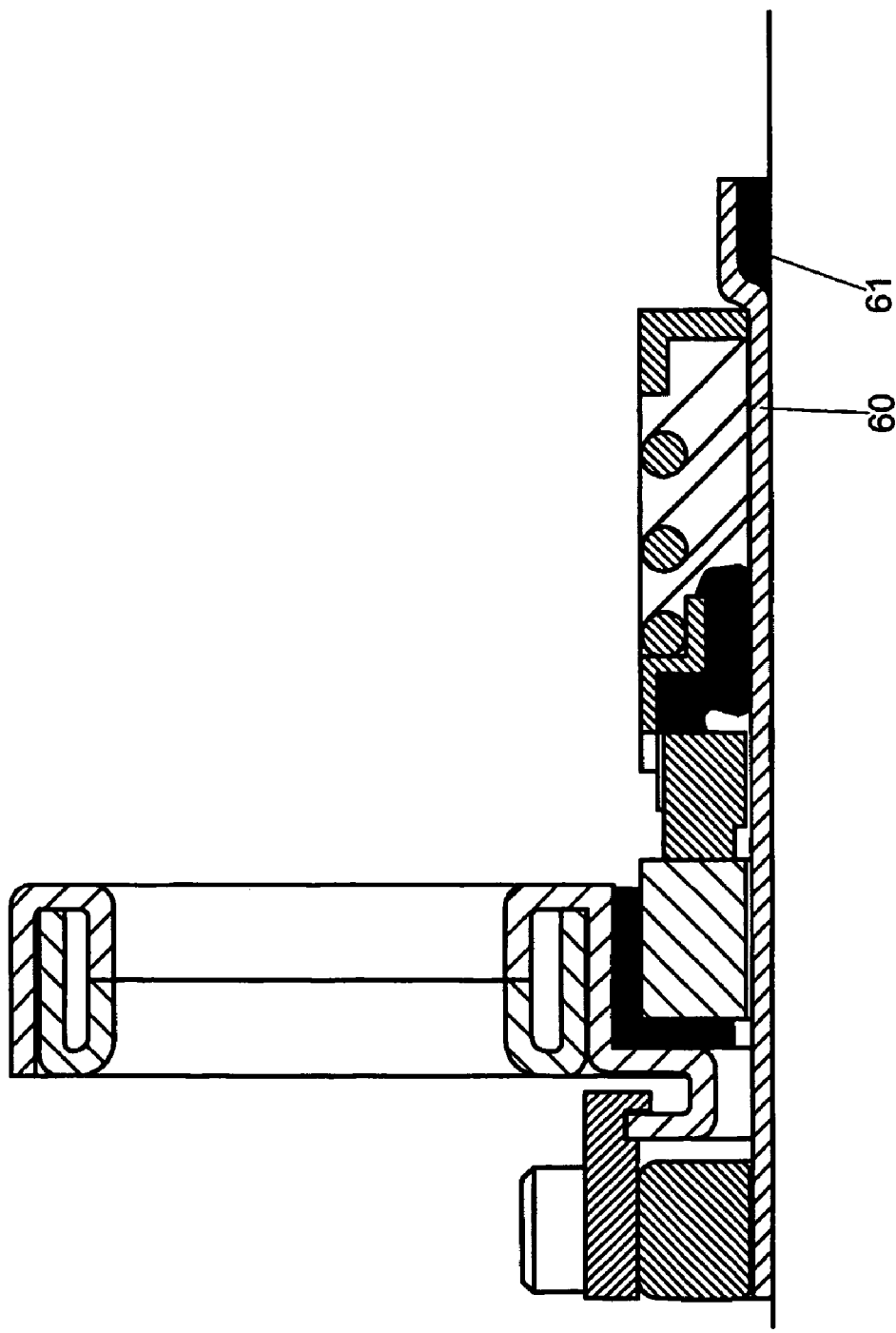
FIG. 8 illustrates an alternative design of the invention, showing an alternative shaft-sealing device.

FIG. 8 of the accompanying drawings illustrates an alternative sleeve 60 and sleeve elastomeric member 61.

Figure 9:
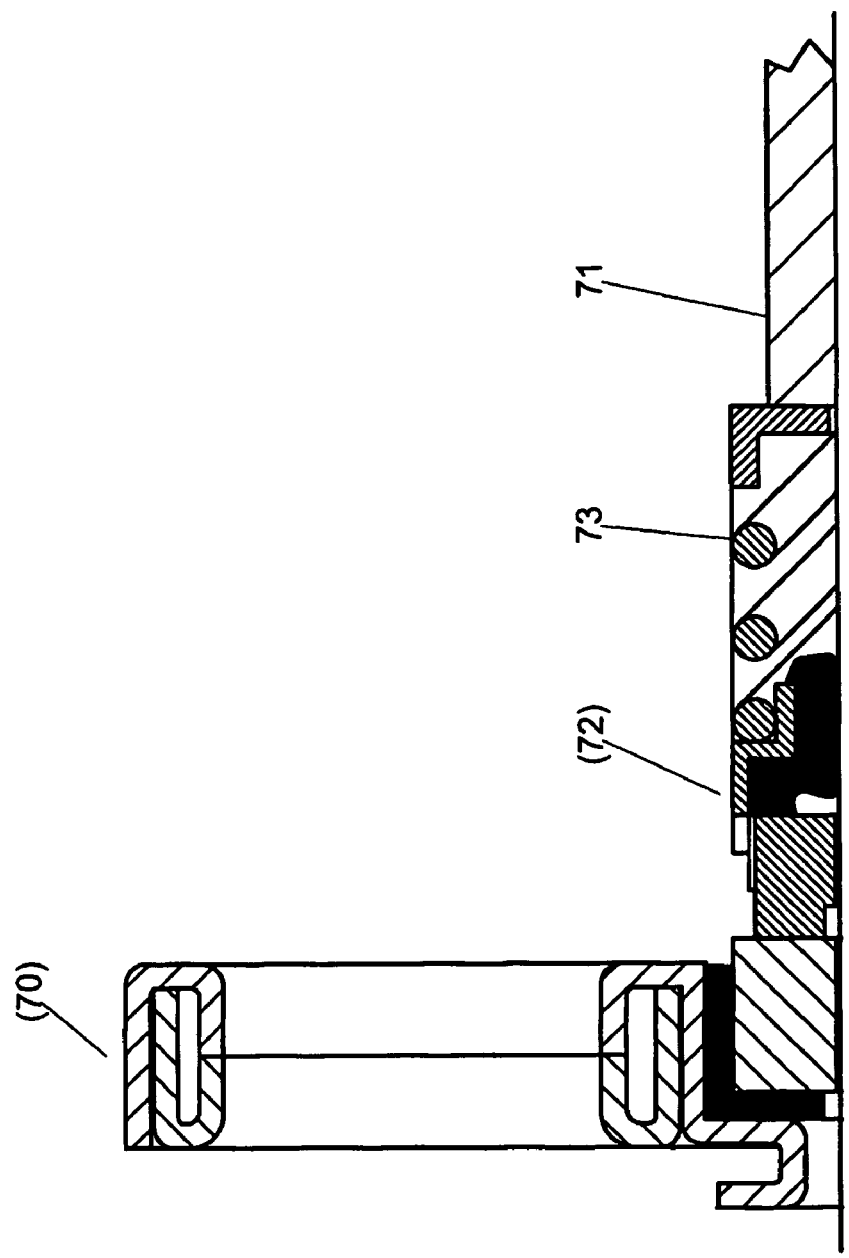
FIG. 9 illustrates an alternative design of the invention, showing a single component seal arrangement.

FIG. 9 illustrates a single component seal of the invention. The gland plate assembly 70 is of similar shape to the aforementioned figures. However the seal design is a component design rather than a cartridge design which incorporates a sleeve member. This design in FIG. 9 has fewer components than that of the cartridge seal variant and therefore will be a produced at a lower cost price.

The seal of FIG. 9 includes a pump setting component 71 which axially positions the rotary seal face assembly 72 in terms of the correct spring 73 working length.

Figure 10:
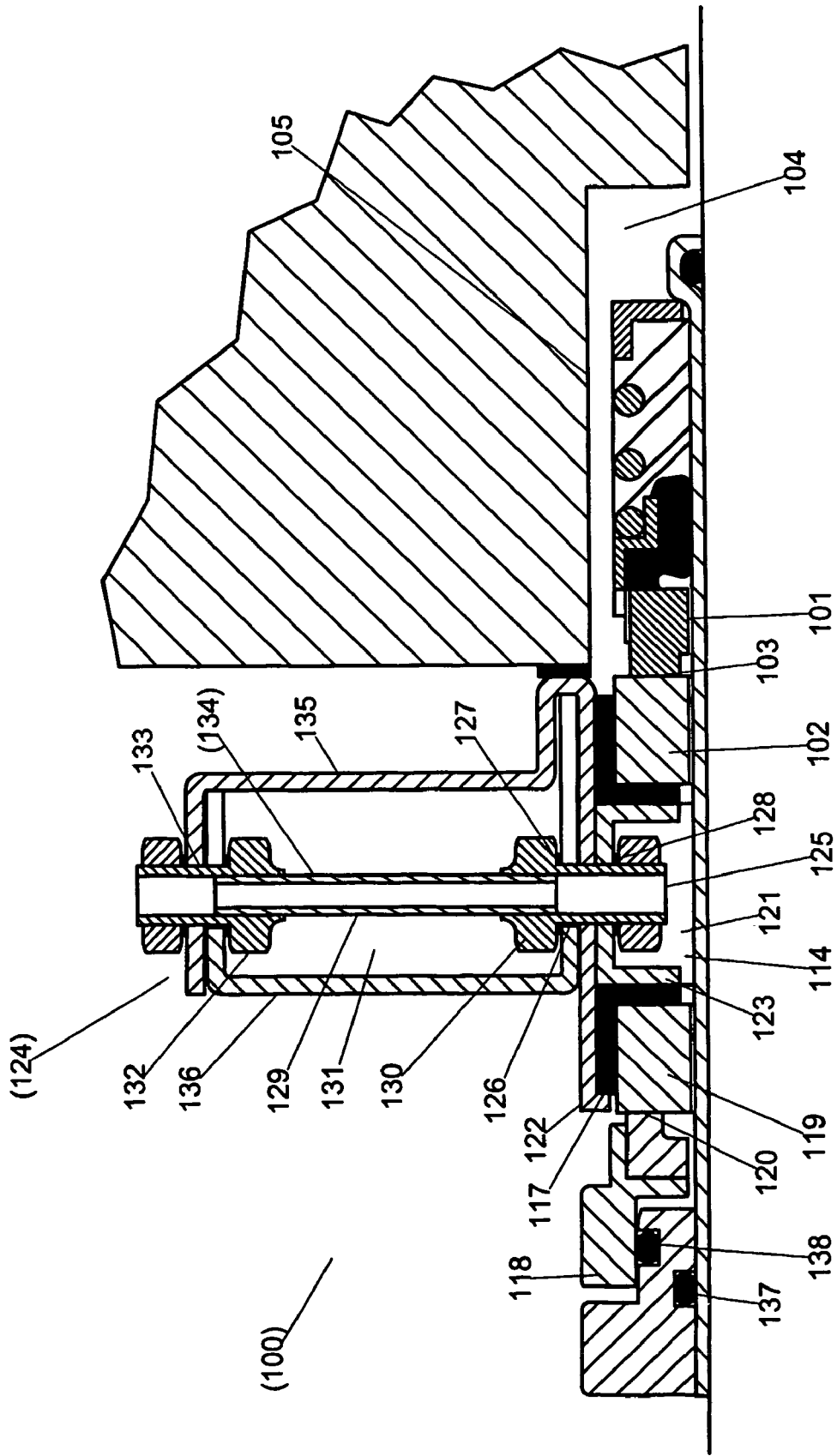
FIG. 10 illustrates an alternative design of the invention, showing a double cartridge seal arrangement.

FIG. 10 shows a double seal 100 version of the invention. Once again the rotary and axially floating seal face 101 is spring biased towards a static stationary seal face 102. The rotary seal face 101 is allowed to slide on the static seal face 102. The interface between the rotary seal face 101 and stationary seal face 102 forms a sealing area 103. This sealing area 103 is the primary seal that prevents the process media 104 from escaping from the process chamber 105. The other secondary inboard sealing points remain identical in concept to FIG. 2.

Towards the outboard side of the seal, the outboard rotary and axially floating seal face 118 is spring biased towards a static stationary seal face 119. The rotary seal face 118 is allowed to slide on the static seal face 119. The interface between the rotary seal face 118 and stationary seal face 119 forms sealing area 120. This outboard sealing area 120 is the primary seal that prevents the barrier media 121 from escaping from the barrier chamber 114. The barrier media 121 is also sealed at the inboard side of the assembly, by sealing area 103.

At the outboard side, the secondary sealing areas include elastomeric member 117 and elastomers 137 and 138.

Once again the static outboard seal face 119 is prevented from rotating by the frictional drive of elastomeric member 117 against gland 122. The gland could incorporate an alternate anti-rotation drive mechanism such as a pressed lug, or a pin and slot arrangement.

An intermediate component 123 is positioned between the two stationary seal faces 102 and 119. Said intermediate component 123 is preferably manufactured from a press steel plate of thin thickness. In an alternative embodiment, this intermediate component 123 is a machined item.

The gland plate assembly 124 is manufactured from three, pressed, preferably sheet steel, components. This assembly 124 is designed in such a way as to eliminate or limit subsequent conventional machining operations. FIG. 10 therefore illustrates that the invention is not limited to a particular number of pressed sheet steel components which make up the gland plate assembly. Sufficiently to state one or more pressed steel components are positioned in such a way to provide the gland plate assembly with strength at a low manufacturing cost.

Barrier media 121 enters insertion hole 125. Preferably a corresponding insertion hole is punched through the gland plate assembly 124 and sealed by rubber washers 127 and 128, if necessary, at either side of the insertion hole 126.

Barrier media 121 enters the barrier chamber 114 preferably via a plastic tube 129 inserted through a rubber washer 127 and 128 and fitting 130 arrangement. This provides a pressure tight and leak tight, leak tight joint. Said barrier fluid 121 lubricates and cools seal faces 120 and 103 and is evacuated via a similar hole and tube arrangement positioned at another place in the gland plate assembly 124.

Thus, it can be seen that pipe 129 and fitting assembly 130 have been incorporated into the hollow cavity 131 of the gland plate assembly 124.

Fittings 130 are preferably of "panel" type construction which are ideal for creating a pressure tight, leak free seal in a thin sheet metal construction such as the gland plate assembly 124.

Panel fittings 130 and 132 are fitted to the punched holes 126 and 133. A pipe 129 connects said fittings, 130 and 132 providing a pressure tight joint. Pipe 129 is preferably a plastic tube. Fittings 130 and 132 preferably accommodate said plastic pipe 129 with a "push-fit", leak tight seal. The invention is not limited to the use of this pipe 129 and fitting 130 and 132 construction. However such a construction is a particular low cost option.

The fitting and pipe assembly 134 is typically installed prior to assembling the rear gland plate flange 135 to the front gland plate flange 136. The front gland plate 136 has an opening, which correspond, to the fitting position in the rear gland plate 135, thereby allowing the joining of both flanges which create the gland plate assembly 124.

Figure 11:
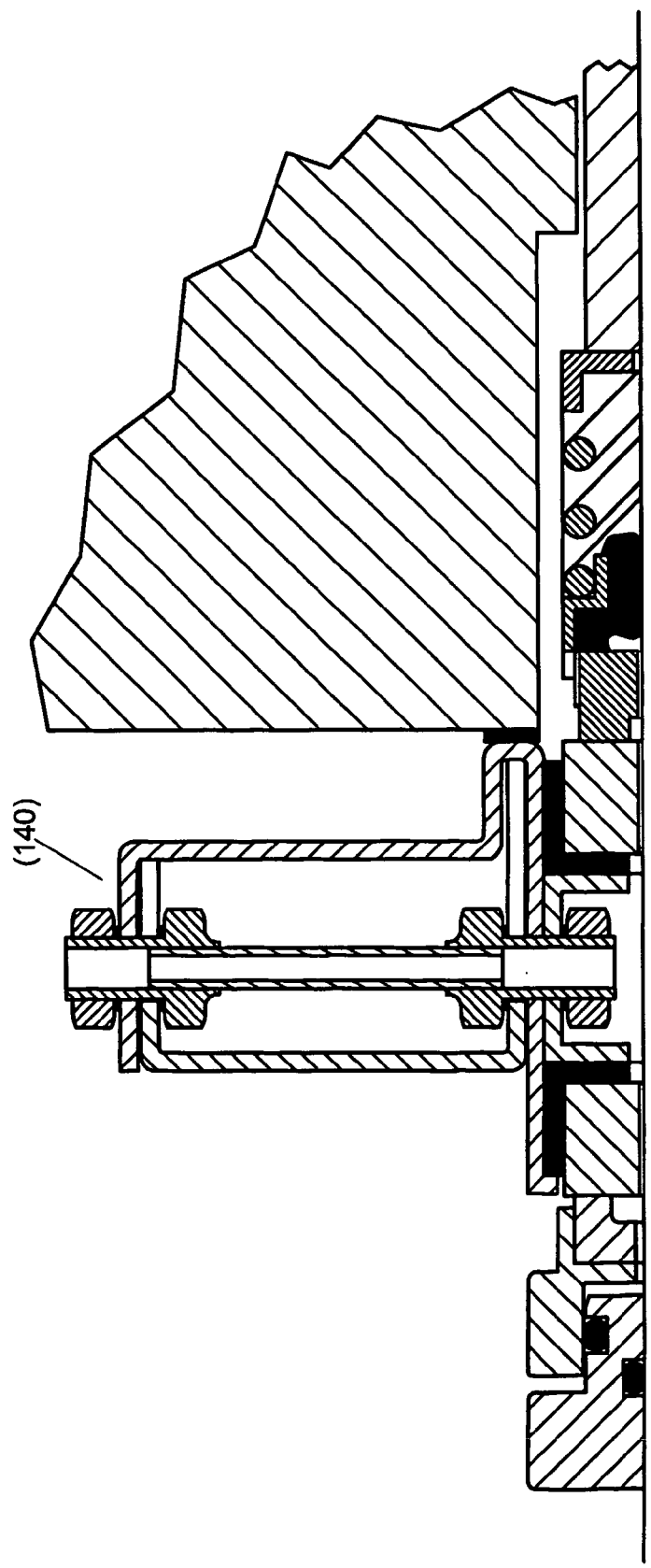
FIG. 11 illustrates an alternative design of the invention, showing a double component seal arrangement.

FIG. 11 illustrates a double component seal of the invention. The gland plate assembly 140 is of similar shape to the aforementioned figures. However the seal design is a component design rather than a cartridge design which incorporates a sleeve member.

Gland plates of the invention may be employed for both rotary seals and stationary seals, single, double or triple mechanical seals, whether designed in a cartridge or component seal format.

Furthermore, the design could be used for both pressurised and non-pressurised barrier fluid systems.

The invention may be used with metallic components as well as non-metallic components such as plastic. Some types of equipment rotate the housing and have a stationary shaft. It is considered that the invention can be similarly applied to such designs.

Figure 12:
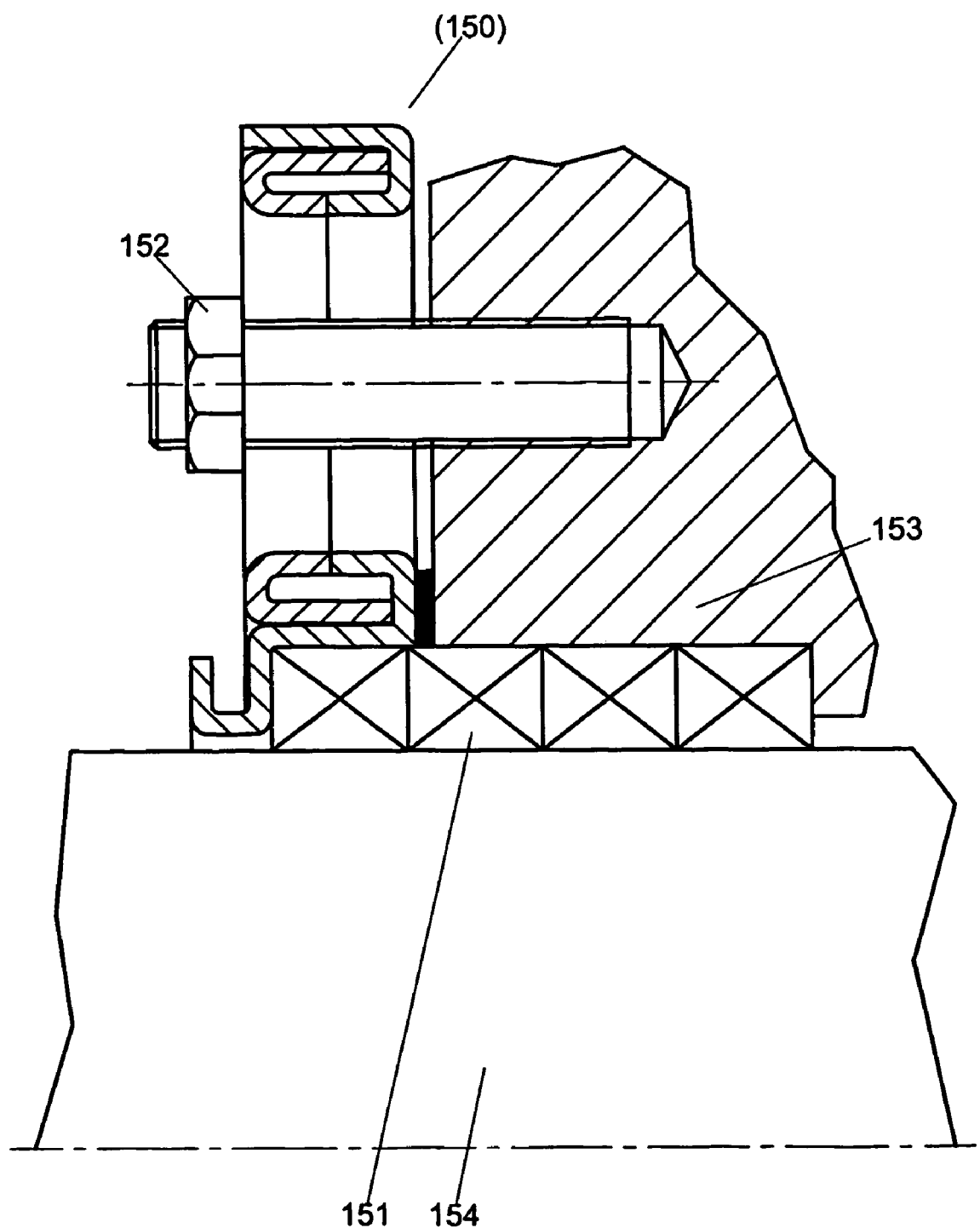
FIG. 12 illustrates an alternative design of the invention, showing a gland plate assembly and packing arrangement.

FIG. 12 illustrates that, the gland plate assembly 150 of the invention is by no means limited for the use of a mechanical seal. Rotating equipment is often sealed by other means such as packing 151.

Packing is a traditional manner of sealing rotating equipment at a low cost. The gland plate assembly 150 of the invention is therefore particularly suited for this type of sealing since this too is a low cost option.

As shown in FIG. 12, the gland plate assembly 150 can be adopted to transmit the compressive forces from at least one screw 152 to the packing 151. This thereby creates a seal between the stationary process chamber 153 and rotating shaft 154.

In summary, the invention provides a gland plate assembly which comprises one or more components manufactured from a relatively thin material, said material formed into a shape which is sufficiently rigid to hold a stationary member which may subsequently slide relative to a corresponding rotary member or may be, for instance, a packaging member which creates a seal between a stationary member and a rotating member. In general, no subsequent machining operations are required after the gland plate forming operation. The assembly may be of modular construction thereby permitting its use in more than one sealing arrangement.

The components of the gland plate assembly may be mechanically, and/or chemically, and/or thermally connected together in a non-detachable method. The components of the gland plate assembly are located relative to one another by at least one location member, said location member being an integral part of at least one of the former components. Alternatively, the location member is a separate part to any of the former components.

A gland plate assembly of the invention may contain at least one fitting, which connects two regions of the mechanical seal, allowing a fluid to be passed between the two regions The fitting, including a connecting pipe, may be positioned in the hollow cavity created by at least two components which comprise the gland plate assembly.

The invention claimed is:

1. A gland plate comprising:
a rigid, annular element comprising at least two axially spaced, radially extending walls having a thickness of from about 0.1 to 4 mm, the radially extending walls having a center orifice in the center of the radially extending walls and an outer circumferential perimeter extending around an outer edge of the radially extending walls;
an outer wall extending axially and continuously between the radially extending walls and around the outer circumferential perimeter of the radially extending walls;
an inner wall extending axially and continuously between the radially extending walls and around the center orifice; and
at least one additional orifice formed in the at least two radially extending walls between the center orifice and the outer circumferential perimeter of the radially extending walls and defined by a first axially extending circumferential flange in one of the two radially extending walls and a second axially extending circumferential flange in the other of the two radially extending walls, wherein the first and second flanges are joined such that the first and second flanges extend around the at least one additional orifice and between the two axially spaced, radially extending walls, wherein the outer wall, the inner wall, and the first and second flanges together enclose a hollow interior volume between the axially spaced, radially extending walls.

2. A gland plate according to claim 1 wherein the hollow interior volume is filled with concrete, plastics or water.

3. A gland plate according to claim 1 wherein said radially extending walls are made of metal.

4. A gland plate according to claim 3 wherein said radially extending walls are formed by a pressing operation.

5. A gland plate according to claim 1 wherein the gland plate is provided with one or more through holes formed by the at least one additional orifice.

6. A gland plate according to claim 5 wherein each of said through holes is formed by a pressing or punching operation.

7. A gland plate according to claim 6 wherein material displaced when each of said holes is being formed provides a strengthening support around said hole.

8. A gland plate according to claim 1 further comprising a means for feeding fluid through the hollow interior volume of the gland plate.

9. A gland plate according to claim 8 wherein the means for feeding fluid through the gland plate comprises a sealed orifice formed in the inner wall, a sealed orifice formed in the outer wall and a pipe arranged within the hollow, annular structure and extending between the sealed orifices in the inner and outer walls.

10. A sealing arrangement, comprising:
a gland plate comprising at least two axially spaced, radially extending walls having a thickness of from about 0.1 to 4 mm, the radially extending walls having a center orifice in the center of the radially extending walls and an outer circumferential perimeter extending around an outer edge of the radially extending walls;
an outer wall extending axially and continuously between the radially extending walls and around the outer circumferential perimeter of the radially extending walls;
an inner wall extending axially and continuously between the radially extending walls and around the center orifice; and
at least one additional orifice formed in the at least two radially extending walls between the center orifice and the outer circumferential perimeter of the radially extending walls and defined by a first axially extending circumferential flange in one of the two radially extending walls and a second axially extending circumferential flange in the other of the two radially extending walls, wherein the first and second flanges are joined such that the first and second flanges extend around the at least one additional orifice and between the two axially spaced, radially extending walls, wherein the outer wall, the inner wall, and the first and second flanges together enclose a hollow interior volume between the axially spaced, radially extending walls.

11. A mechanical seal, comprising:
a gland plate comprising a rigid, annular element comprising at least two axially spaced, radially extending walls having a thickness of from about 0.1 to 4 mm, the radially extending walls having a center orifice in the center of the radially extending walls and an outer circumferential perimeter extending around an outer edge of the radially extending walls;

an outer wall extending axially and continuously between the radially extending walls and around the outer circumferential perimeter of the radially extending walls;

an inner wall extending axially and continuously between the radially extending walls and around the center orifice; and at least one additional orifice formed in the at least two radially extending walls between the center orifice and the outer circumferential perimeter of the radially extending walls and defined by a first axially extending circumferential flange in one of the two radially extending walls and a second axially extending circumferential flange in the other of the two radially extending walls, wherein the first and second flanges are joined such that the first and second flanges extend around the at least one additional orifice and between the two axially spaced, radially extending walls, wherein the outer wall, the inner wall, and the first and second flanges together enclose a hollow interior volume between the axially spaced, radially extending walls.

* * * * *